Figure 1:
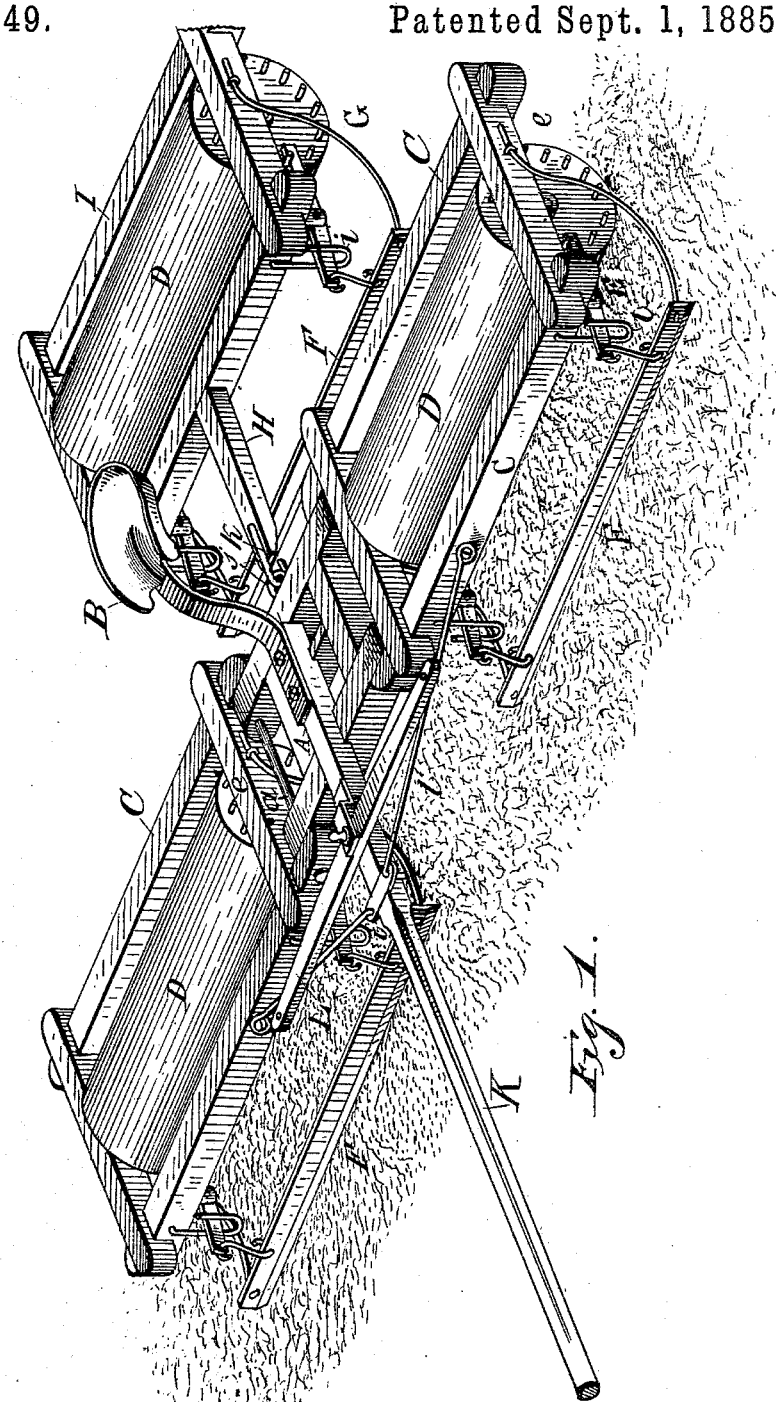

(No Model.) 2 Sheets—Sheet 2.
A. LOWRY.
GRAIN CULTIVATOR.
No. 325,549. Patented Sept. 1, 1885.
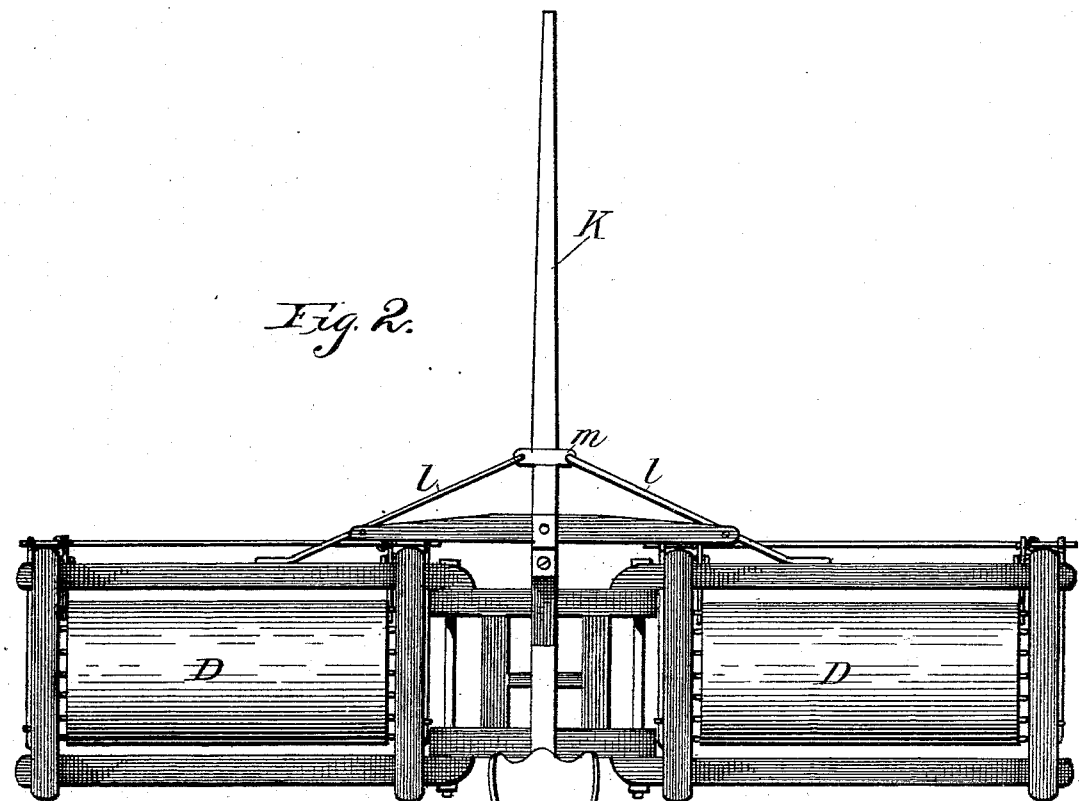
Fig. 2.
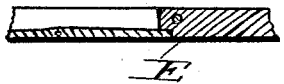
Fig. 4.
Fig. 3.
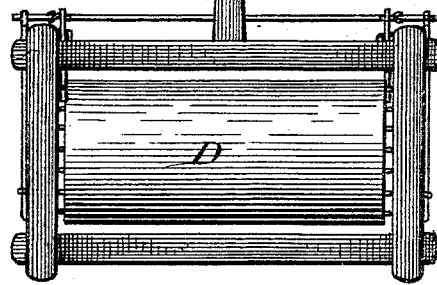
WITNESSES
John Enders Jr
F. R. Harding
INVENTOR
Albert Lowry
By O. E. Duff
Attorney
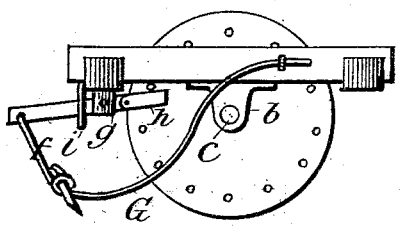

UNITED STATES PATENT OFFICE.

ALBERT LOWRY, OF LISBON, DAKOTA TERRITORY, ASSIGNOR OF ONE-HALF TO GEO. N. LAMPHERE, OF MOORHEAD, MINNESOTA.

GRAIN-CULTIVATOR.

SPECIFICATION forming part of Letters Patent No. 325,549, dated September 1, 1885.

Application filed June 22, 1885. (No model.)

*To all whom it may concern:*

Be it known that I, ALBERT LOWRY, of Lisbon, in the county of Ransom and Territory of Dakota, have invented certain new and useful Improvements in Grain-Cultivators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of my invention is to provide a new feature in agricultural cultivators, and it consists of a combined land-roller and grain-plant cutter.

The complete invention is composed of a grain-cultivator having three rollers, arranged in a manner to be hereinafter described, and each roller is provided with a vertically-operating knife in front of the said roller, which is so arranged as to cut the young shoots before the land is rolled. The rollers are placed in frames of suitable construction, and arranged with the two forward rollers in front and directly opposite to each other, while the third roller is attached behind and to the center of the middle frame by a short reach, which allows the said roller to trail in the wake of the other two, and thereby cover any ground that had been omitted by the forward rollers, should they be swerved from their course by an obstruction. The side frames, in which the two forward rollers are secured, are both hinged and fastened to the central frame by means of an elongated pintle or pin provided with screw-threads and nuts. The ends of the rollers are provided with a series of metallic pins, which are driven near the edge thereof, and at suitable intervals apart, or may be cast on a circular metallic plate or stave, which could be secured upon the periphery of said ends. The knives are attached to the rollers by a lever fulcrumed in slotted studs, and attached to the side frame of the rollers, and are also provided with a bent spring, one end of which is fastened to the knife and the other in the end beam of the frame of the roller. The spring is so constructed that its tension will tend to hold the knife down or to bring it back in its original position when it has been vertically elevated by the fulcrumed lever. The vertical motion of the knives is produced by the fulcrumed lever, one end of which projects in the spaces between the pins on the end of the roller, and the other end being secured to the body of the knife by hooks, as will be seen in the illustration. This lever is centrally provided with a knuckle-joint for the purpose of reversing the motion of the rollers when it is so desired. Thus it will be obvious that when the roller revolves forward the pins depress the lever and thereby raise the other end secured to the knife, and when it is desired to reverse the motion of rollers the action of the knuckle-joint allows the pins to engage the end of the fulcrumed lever; but, as will be seen by the construction of said joint, it will not operate the knives when a backward motion is imparted, but will merely allow the rollers to move backwardly. The arrangement of the third roller is designed to facilitate the turning of the machine, and also to cover ground that may have been omitted by the forward rollers had they encountered any obstacle, such as a stone or stump. The short reach is provided with a metallic hook, which engages a staple driven in the central portion of the rear part of the frame, thus allowing a free or swinging motion to the rear roller.

The machine when completed requires to be drawn by horse or steam power, and if used for the former I provide a driver's seat of suitable construction arranged on the central frame-work.

Referring to the drawings, Figure 1 is a perspective view of my improvement. Fig. 2 is a plan view. Fig. 3 is a detail end view of the roller, showing the bent spring, pins, fulcrumed lever, and the manner of securing the knife to the roller. Fig. 4 is a detail view of the fulcrumed lever provided with a knuckle-joint which will allow a backward movement of the rollers without operating the knives.

Like letters of reference indicate corresponding parts.

A is the central frame-work, provided with the seat B, of suitable construction. C is the frame of the two front rollers, D, which is secured and hinged to the central frame by the pintle $a$, having screw-threads and nuts thereon. The roller D is secured to the side frames, C, by a journal-bearing, $b$, secured to the under side of the end beam of the frame C, into which the shaft $c$ of the roller is inserted. The pins $e$ are arranged near the edge upon the cylindrical end of the roller at suitable intervals apart for the admission of one end of the fulcrumed lever E, the other end of which is connected to the knife F by means of the metallic hooks $f$. This lever is fulcrumed in a slotted stud, $g$, attached to the frame by a pintle, and is also provided with a knuckle-joint, $h$, for the purpose hereinbefore described. The knife F is made of steel, and corresponds in length with the roller, and it is prevented from coming in contact with the ground by the stirrup or link $i$, which is secured to the upper frame-work.

G is the bent spring, adapted to return the knife against the stirrup $i$ after it has been raised by the fulcrumed lever; and it is secured at one end to the knife and at the other to the frame of the roller by a small staple, as shown in Fig. 3.

H is the short reach-pole, forming a part of the frame-work I of the rear roller, D, and it is secured in the staple $j$ in the central portion of the front frame by the hook $k$. The knife, spring, lever, and fastening device for the rear roller are arranged in the same manner as the front rollers.

K is the tongue of the machine, secured in any suitable manner to the central framework; and it is provided with the braces or rods $l\ l$, one end of each being secured to a plate on the tongue at $m$, and the other ends are attached to the front beams of the frames of the front rollers, and serve to guide and brace them when it is desired to turn the machine around. The back roller, having free action by means of the short reach and connection, does not require any brace whatsoever.

L is the double-tree, held in position by a pin passing through a metallic latch or strip secured upon the tongue of the machine.

I deem it necessary to explain here particularly the purpose of constructing my machine as it has been hereinbefore described.

It is doubtless well known that when grain—such as wheat and oats—has been sown, the ground freezes in the winter, and in the spring, when the sun begins to thaw the ground, the surface cracks and exposes the seed or root to the open air, and to provide a machine for properly treating the grain when in this state is the object of my invention. The arrangement of the rollers in this particular manner is for pressing and settling the ground around the roots of the plant which have been exposed by the action of the sun.

In rolling uneven or hilly surfaces, where the rollers are apt to encounter obstructions, I have, as hereinbefore mentioned, hinged each wing or frame to the main frame, so that one of the rollers could be raised to a higher plane without disturbing the level of the other. The knives, arranged as described, enable a farmer to cut off the heads of a grain plant before the rollers pass over them, and thereby insure the increase of one shoot to several. Thus it will be seen that by providing the roller with the reciprocating or automatic knives it is invaluable in the cultivation of grain, for the reason that if the grain is not treated in a manner similar to that described it would be lacking in body, and the stalk would shoot up in a single plant, and consequently break off or droop, as is a well-known fact.

Having thus described my invention, what I claim as new, and desire to secure by Letters Patent is—

1. A grain-cultivator provided with three land-rollers, two abreast and in front, and each roller operating independently of the others, and the third arranged centrally behind, and each roller being provided with an automatic operating-knife in front thereof, all arranged and combined to operate as set forth.

2. In a grain-cultivator, the rollers, each having escapement-teeth on their ends, in combination with the knives in front thereof, the fulcrumed lever having a knuckle-joint, as described, said lever serving to operate the knives when the rollers are propelled forward, and allowing a backward motion of the roller without operating the knives, as set forth and described.

3. The combination, with the hereinbefore-described knives, of the rollers having pins $e$, the fulcrumed lever E, stirrup $i$, slotted stud $g$, hooks $f$, and bent spring G, as set forth.

4. The combination of the rollers, having pins at suitable intervals apart on their ends, the operating-spring, and knuckle-jointed lever, as set forth.

In testimony that I claim the foregoing as my own I hereunto affix my signature in presence of two witnesses.

ALBERT LOWRY.

Witnesses:
H. H. GROVER,
L. S. KNOTTS.